US008572002B2

(12) United States Patent
Kadaba

(10) Patent No.: US 8,572,002 B2
(45) Date of Patent: Oct. 29, 2013

(54) SYSTEMS, METHODS, AND COMPUTER-PROGRAM PRODUCTS FOR DETERMINING SHIPPING INCENTIVES

(75) Inventor: Nagesh Kadaba, Roswell, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 68 days.

(21) Appl. No.: 13/332,911

(22) Filed: Dec. 21, 2011

(65) Prior Publication Data

US 2013/0166359 A1 Jun. 27, 2013

(51) Int. Cl.
*G06Q 30/00* (2012.01)

(52) U.S. Cl.
USPC .......................................................... 705/337

(58) Field of Classification Search
USPC .......................................................... 705/337
See application file for complete search history.

(56) References Cited

U.S. PATENT DOCUMENTS

| 5,699,258 | A | 12/1997 | Thiel |
| 2002/0178023 | A1 | 11/2002 | Bjerre et al. |
| 2003/0009361 | A1 | 1/2003 | Hancock et al. |
| 2004/0249699 | A1 | 12/2004 | Laurent et al. |
| 2005/0267791 | A1 | 12/2005 | LaVoie et al. |
| 2006/0041481 | A1 | 2/2006 | Stowe |
| 2008/0301009 | A1 | 12/2008 | Plaster et al. |

OTHER PUBLICATIONS

International Searching Authority, International Search Report and Written Opinion for International Application No. PCT/US2012/044556, mailed Jan. 15, 2013, United States Patent and Trademark Office, 19 pages, USA.

*Primary Examiner* — Thomas Dixon
(74) *Attorney, Agent, or Firm* — Alston & Bird LLP

(57) ABSTRACT

Various embodiments of the present invention provide systems, methods, and computer-program products for determining shipping incentives. In general, various embodiments of the invention involve applying a shipping incentive for a customer receiving inbound shipments from a plurality of parties based on increased inbound shipments received from such parties. While other embodiments of the invention involve applying a shipping incentive to at least one customer based on increased shipments shipped to and/or received in a locale for a particular time period using a common carrier. In particular embodiments, the incentive may be a discount on a cost of shipping for the customer. While in other embodiments, the incentive may be something else such as a preferred shipping service for the customer.

16 Claims, 5 Drawing Sheets

SYSTEMS, METHODS, AND COMPUTER-PROGRAM PRODUCTS FOR DETERMINING SHIPPING INCENTIVES

BACKGROUND

Common carriers are constantly looking for opportunities to improve services to their customers while also improving the cost of providing such services, not only to customers, but also to themselves. In many instances, an easy method for improving the cost of shipping to various locations is to have the appropriate volume of shipments being received and shipped from/to the particular locations. For example, a common carrier will typically realize a cost benefit by having the appropriate amount of shipments leaving a location and/or arriving at a location. This is because, in such instances, the common carrier can take full advantage of the capacity the common carrier has for shipments leaving and/or arriving at the location. That is, the common carrier can use all of the capacity available for the vehicles the common carrier has leaving and/or arriving at the location. Thus, a need exists in the art to identify when such capacity may exist so that a common carrier can take advantage of such capacity and provide incentives to customers to increase shipments to make use of such capacity.

BRIEF SUMMARY OF VARIOUS EMBODIMENTS OF THE INVENTION

Various embodiments of the invention provide systems, methods, and computer-program products for applying a shipping incentive for a customer receiving inbound shipments from a plurality of parties. For instance, in particular embodiments, the customer is a manufacturer and the plurality of parties is suppliers. Particular embodiments involve receiving information on the inbound shipments to be received from the plurality of parties and identifying parties of the plurality of parties shipping respective inbound shipments not using a preferred common carrier. For at least one of the identified parties not shipping via the preferred common carrier, an incentive is determined that can be applied for the customer if the at least one of the identified parties were to use the preferred common carrier. Thus, for each of the identified parties that switch shipping to using the preferred common carrier, the incentive is applied for the customer.

In particular embodiments, the incentive is a discount on a cost of shipping for the customer. In particular instances, the shipping for the customer includes the inbound shipments being received from the plurality of parties and outbound shipments being made by the customer.

While in other embodiments, the incentive is something else such as a preferred shipping service for the customer. In addition, in particular embodiments, an incentive may be determined and applied for the customer for each party already shipping the particular inbound shipment coming from the particular party by using the preferred common carrier.

Further, various embodiments of the invention provide systems, methods, and computer-program products for applying a shipping incentive to at least one customer. In these particular embodiments, information is received on one or more shipments scheduled to be made to a plurality of locales for a particular time period and shipped using a common carrier. For each locale, a determination is made as to whether the one or more shipments being made to the particular locale meet a maximum capacity the common carrier can ship to the locale for the particular time period. For at least one locale in which the maximum capacity is not being met, various embodiments involve identifying one or more customers making the one or more shipments to the at least one locale for the particular time period, determining an incentive based on one or more new shipments being made by the one or more identified customers in addition to the one or more shipments already being made to the at least one locale for the particular time period, and applying the corresponding incentive for the one or more identified customers based on the one or more new shipments being made by the identified customers.

In particular embodiments, the incentive may be a discount on a cost of shipping for the one or more identified customers. While in other embodiments, the incentive may be something else such as at least one preferred shipping service for the one or more identified customers. Furthermore, in particular embodiments, the incentive applied for the one or more identified customers may differ among the identified customers.

Particular embodiments may further involve identifying, for at least one locale in which the maximum capacity is not being met, one or more customers receiving one or more of the shipments being made to the at least one locale for the particular time period, determining an incentive based on one or more new shipments being received by the identified customers in addition to the one or more shipments already being received by the identified customers for the at least one locale for the particular time period, and applying the corresponding incentive for the identified customers based on the new shipments being received by the identified customers. In addition, particular embodiments may further involve identifying, for at least one locale, one or more customers that have made shipments to the at least one locale for a time period other than the particular time period, and for each customer that has made shipments to the at least one locale for the time period other than the particular time period, determining an incentive based on one or more new shipments being made by the identified customers to the at least one locale for the particular time period in addition to the one or more shipments already being made to at least one locale for the particular time period, and applying the corresponding incentive for the one or more identified customers based on the new shipments being made by the identified customers to the at least one locale for the particular time period.

Further, additional embodiments of the invention also provide systems, methods, and computer-program products for applying a shipping incentive to at least one customer. For these particular embodiments, information is received on one or more shipments scheduled to be made from a plurality of locales for a particular time period and shipped using a common carrier. In this particular instance, a determination is made for each locale as to whether the one or more shipments being made from the particular locale meet a maximum capacity the common carrier can ship from the locale for the particular time period. For at least one locale in which the maximum capacity is not being met, the embodiments involve identifying one or more customers making the shipments from the at least one locale for the particular time period, determining an incentive based on one or more new shipments being made by the one or more identified customers from the at least one locale for the particular time period in addition to the shipments already being made from the at least one locale for the particular time period, and applying the corresponding incentive for the identified customers based on the new shipments being made by the identified customers from the at least one locale for the particular time period.

Again, in particular embodiments, the incentive may be a discount on a cost of shipping for the one or more identified customers. While in other embodiments, the incentive may be something else such as at least one preferred shipping service for the one or more identified customers. Furthermore, in particular embodiments, the incentive applied for the one or more identified customers may differ among the identified customers.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF VARIOUS EMBODIMENTS OF THE INVENTION

Figure 1:
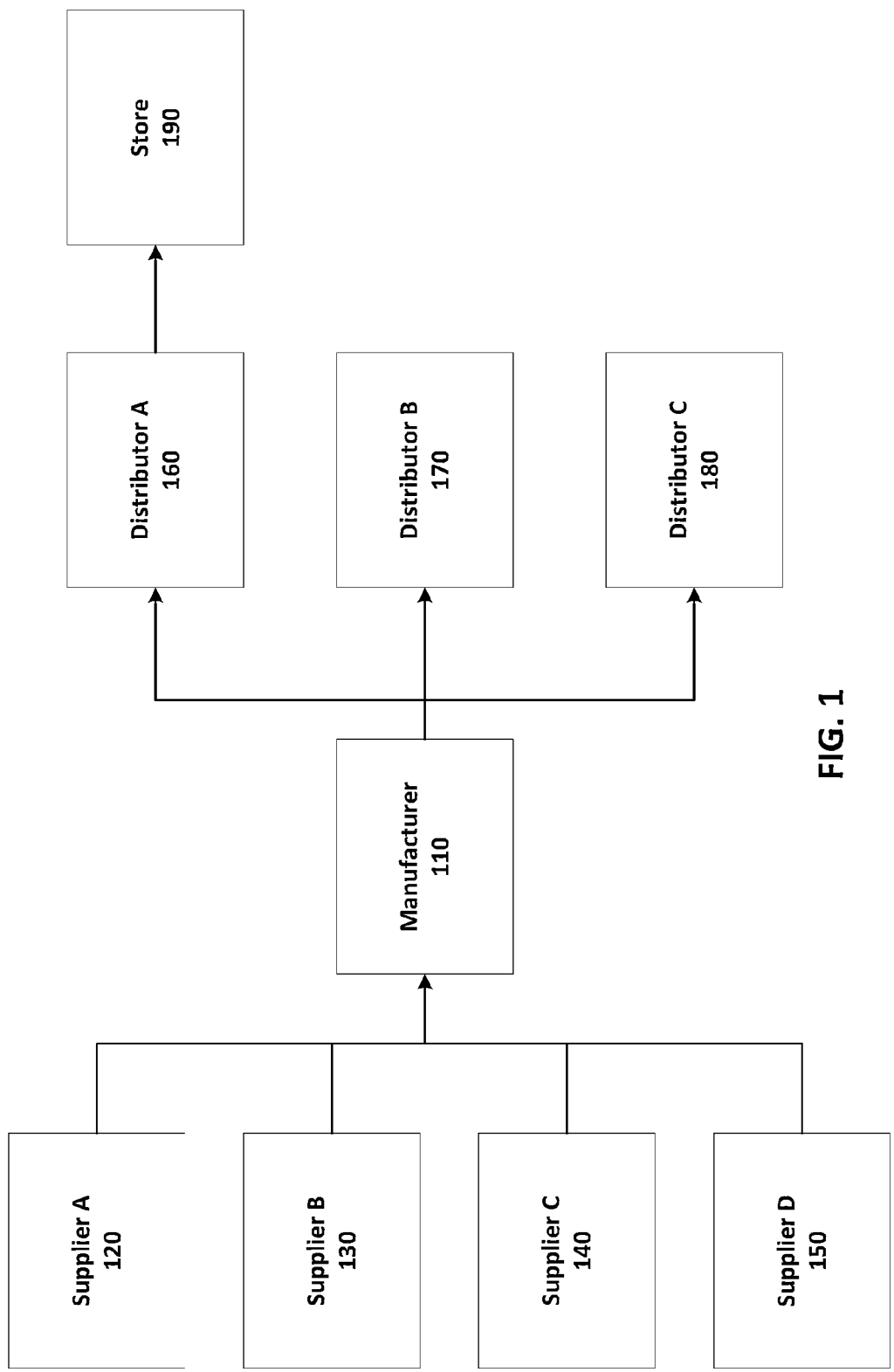
FIG. 1 shows the relationships between entities that may practice various aspects of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. Like numbers refer to like elements throughout.

I. Methods, Apparatus, Systems, and Computer Program Products

As should be appreciated, the embodiments may be implemented in various ways, including as methods, apparatus, systems, or computer program products. Accordingly, the embodiments may take the form of an entirely hardware embodiment or an embodiment in which a processor is programmed to perform certain steps. Furthermore, the various implementations may take the form of a computer program product on a computer-readable storage medium having computer-readable program instructions embodied in the storage medium. Any suitable computer-readable storage medium may be utilized including hard disks, CD-ROMs, optical storage devices, or magnetic storage devices.

Particular embodiments are described below with reference to block diagrams and flowchart illustrations of methods, apparatus, systems, and computer program products. It should be understood that each block of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or operations, or combinations of special purpose hardware and computer instructions.

II. Entity Relationships

FIG. 1 provides an illustration of relationships between entities that may practice various aspects of the present invention. It should be noted that the particular entities shown in FIG. 1 are for illustrative purposes only and should not be construed to limit the scope of the invention. The particular entities shown in FIG. 1 are used to help demonstrate various features of the invention as discussed in further detail below.

The entities shown in FIG. 1 include suppliers 120, 130, 140, 150, a manufacturer 110, distributors 160, 170, 180, and a store 190. In this particular instance, the manufacturer 110 manufactures a product in which the suppliers 120, 130, 140, 150 provide one or more "raw materials" used in the manufacturing of the product. For example, the manufacturer 110 may produce bicycles and the suppliers 120, 130, 140, 150 may provide various components used to manufacture the bicycles such as carbon fiber for the bicycle frame, components for the gears and brakes, and tires.

In addition, the manufacturer 110 may have one or more distributors 160, 170, 180 through which the manufacturer 110 may distribute its product, and these distributors 160, 170, 180 may have relationships with one or more stores 190 to which they provide the product. Thus, returning to the example, the manufacturer 110 may assemble the components received from the suppliers 120, 130, 140, 150 to produce the bicycles and may send the bicycles to the various distributors 160, 170, 180. Depending on the circumstances, the distributors 160, 170, 180 may be solely distributors for the manufacturer 110 or may be independent third-party distributors. Furthermore, the store(s) 190 associated with the distributor(s) 160 may be solely a store for the manufacturer 110 or may be an independent third-party store. For example, in one instance, the manufacturer 110 may be Bianchi® and the distributors 160, 170, 180 may solely distribute Bianchi® bicycles to Bianchi® bike store(s) 190. In another instance, the manufacturer 110 may be Bianchi® and the distributors 160, 170, 180 may distribute several different brands of bicycles to independent bike shop(s) 190.

A major component of the distribution channel described above is the shipping of "raw materials" and assembled products between entities. Depending on factors such as the relationships and locations of the various entities, the shipping may occur via different methods. However, in many instances, the various entities will use one or more common carriers to fulfill the entities' shipping needs.

III. Exemplary System Architecture

Figure 2:
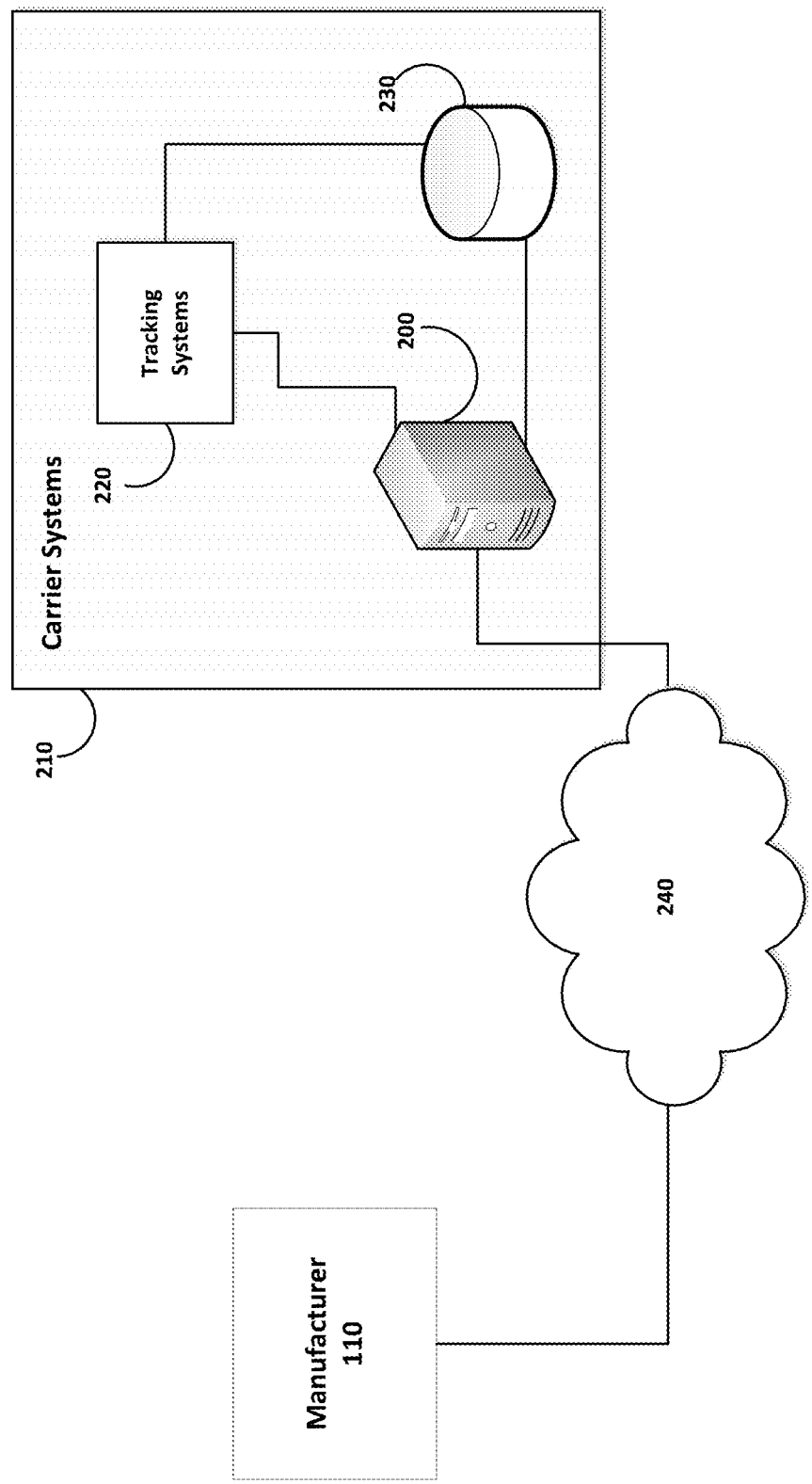
FIG. 2 shows an overview of one embodiment of an architecture that can be used to practice various aspects of the present invention.

FIG. 2 provides an illustration of a system architecture that can be used in conjunction with various embodiments of the present invention. As shown in FIG. 2, the system architecture may include the manufacturer 110 being in electronic communication with a system 210 associated with a common carrier shipping the packages to facilitate the transfer of information between the manufacturer 110 and the common carrier used for shipping the packages. Such communication may be facilitated over the same or different wireless or wired networks 240 including, for example, a wired or wireless Personal Area Network (PAN), Local Area Network (LAN), Metropolitan Area Network (MAN), Wide Area Network (WAN), or the like.

In various embodiments, the carrier systems 210 may include sub-systems and/or components such as servers and storage media. For instance, in FIG. 2, the carrier systems 210 includes one or more tracking systems 220 for tracking packages as the packages are scheduled and shipped with the common carrier. In addition, in particular embodiments, the carrier systems 210 include one or more servers 200. In particular instances, these one or more servers 200 may be in communication with one or more types of storage media 230. In addition, the one or more servers 200 may include a database management system and the storage media 230 may include one or more databases and one or more database instances. In various embodiments, the storage media 230 may be one or more types of media such as hard disks, magnetic tapes, optical media, or flash memory. The term "database" refers to a structured collection of records or data that is stored in a computer system, such as via a relational database, hierarchical database, or network database.

It should be noted that other system architectures are contemplated that may be used to practice various aspects of the invention. Thus, the system architecture provided in FIG. 2 is for illustrative purposes only and should not be construed to limit the scope of the invention. Further, while FIG. 2 illustrates certain system entities as separate, stand-alone entities, the various embodiments are not limited to this particular architecture.

a. Carrier Server

Figure 3:
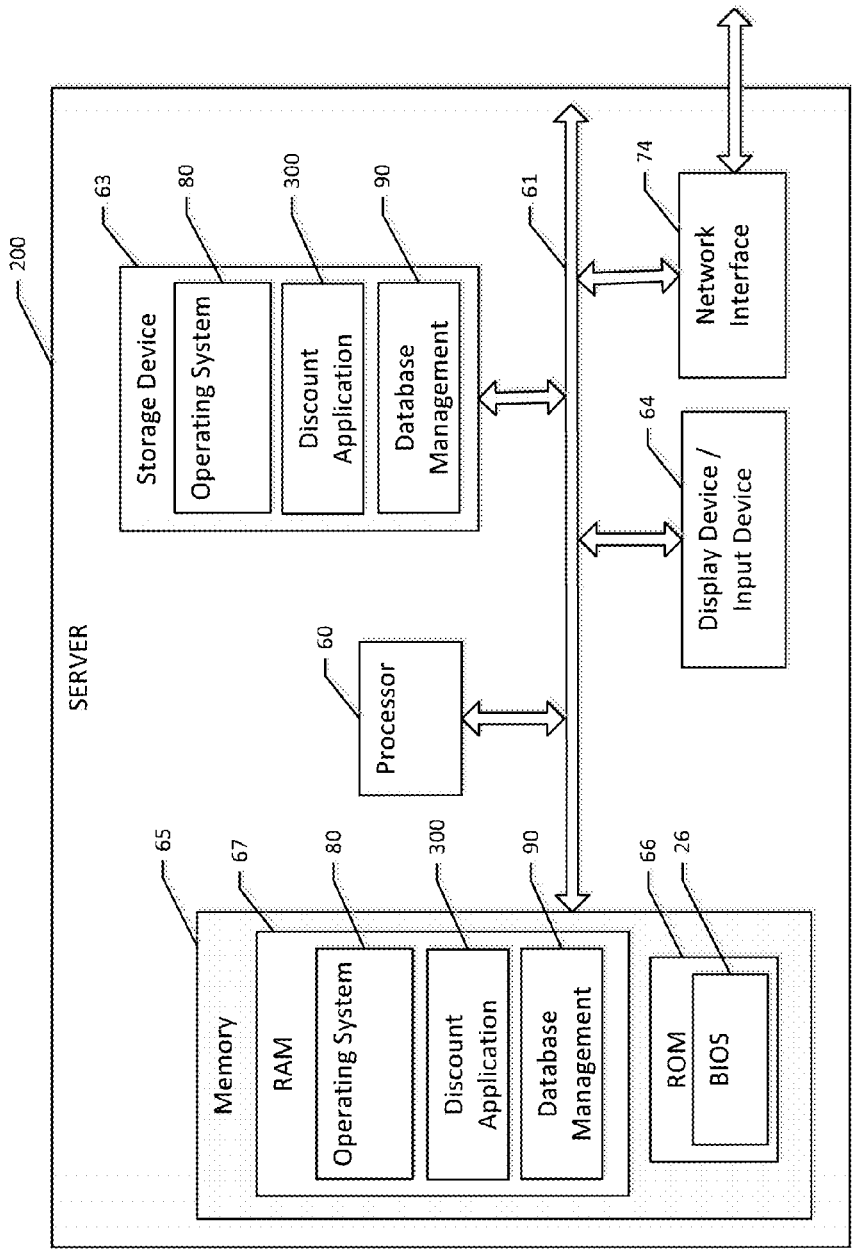
FIG. 3 shows an exemplary schematic diagram of a carrier server according to one embodiment of the present invention.

FIG. 3 provides a schematic of a server 200 that may be located in the carrier systems 210 according to one embodiment of the present invention. The term "server" is used generically to refer to any computer, computing device, desktop, notebook or laptop, distributed system, server, gateway, switch, or other processing device adapted to perform the functions described herein. As will be understood from this figure, in this embodiment, the server 200 includes a processor 60 that communicates with other elements within the operating object server 200 via a system interface or bus 61. The processor 60 may be embodied in a number of different ways. For example, the processor 60 may be embodied as various processing means such as a processing element, a microprocessor, a coprocessor, a controller or various other processing devices including integrated circuits such as an application specific integrated circuit ("ASIC"), a field programmable gate array ("FPGA"), a hardware accelerator, or the like. In an exemplary embodiment, the processor 60 may be configured to execute instructions stored in the device memory or otherwise accessible to the processor 60. As such, whether configured by hardware or software methods, or by a combination thereof, the processor 60 may represent an entity capable of performing operations according to embodiments of the present invention while configured accordingly. A display device/input device 64 for receiving and displaying data is also included in the server 200. This display device/input device 64 may be, for example, a keyboard or pointing device that is used in combination with a monitor. The server 200 further includes memory 65, which may include both read-only memory ("ROM") 66 and random-access memory ("RAM") 67. The application server's ROM 66 may be used to store a basic input/output system ("BIOS") 26 containing the basic routines that help to transfer information to the different elements within the server 200.

In addition, in one embodiment, the server 200 includes at least one storage device 63, such as a hard disk drive, a CD drive, and/or an optical disk drive for storing information on various computer-readable media. The storage device(s) 63 and its associated computer-readable media may provide nonvolatile storage. The computer-readable media described above could be replaced by any other type of computer-readable media, such as embedded or removable multimedia memory cards ("MMCs"), secure digital ("SD") memory cards, Memory Sticks, electrically erasable programmable read-only memory ("EEPROM"), flash memory, hard disk, or the like. Additionally, each of these storage devices 63 may be connected to the system bus 61 by an appropriate interface.

Furthermore, a number of program modules (e.g., set of computer program instructions) may be stored by the various storage devices 63 and/or within RAM 67. Such program modules may include an operating system 80 and a discount application 300. In particular embodiments, the application 300 may include one or more modules configured to control certain aspects of the operation of the server 200 with the assistance of the processor 60 and operating system 80, although their functionality need not be modularized.

Also located within the server 200, in one embodiment, is a network interface 74 for interfacing with various computing entities. This communication may be via the same or different wired or wireless networks (or a combination of wired and wireless networks), as discussed above. For instance, the communication may be executed using a wired data transmission protocol, such as fiber distributed data interface ("FDDI"), digital subscriber line ("DSL"), Ethernet, asynchronous transfer mode ("ATM"), frame relay, data over cable service interface specification ("DOCSIS"), or any other wired transmission protocol. Similarly, the operating object server 200 may be configured to communicate via wireless external communication networks using any of a variety of protocols, such as 802.11, general packet radio service ("GPRS"), wideband code division multiple access ("W-CDMA"), or any other wireless protocol.

It will be appreciated that one or more of the server's 200 components may be located remotely from other server 200 components, such as multiple servers 200. Furthermore, one or more of the components may be combined and additional components performing functions described herein may be included in the server 200.

b. Additional Exemplary System Components

In various embodiments, the tracking systems 220 may also include components and functionality similar to that of the server 200. For example, in one embodiment, the tracking systems 220 include one or more entities that may include: (1) a processor that communicates with other elements via a system interface or bus; (2) a display device/input device; (3) memory including both ROM and RAM; (4) a storage device; and (5) a network interface. It should be understood that these architectures are provided for exemplary purposes only and are not limiting to the various embodiments. The term "computing device" is used generically to refer to any computer, computing device, desktop, notebook or laptop, distributed system, server, gateway, switch, or other processing device adapted to perform the functions described herein.

IV. Exemplary System Operation

Figure 4:
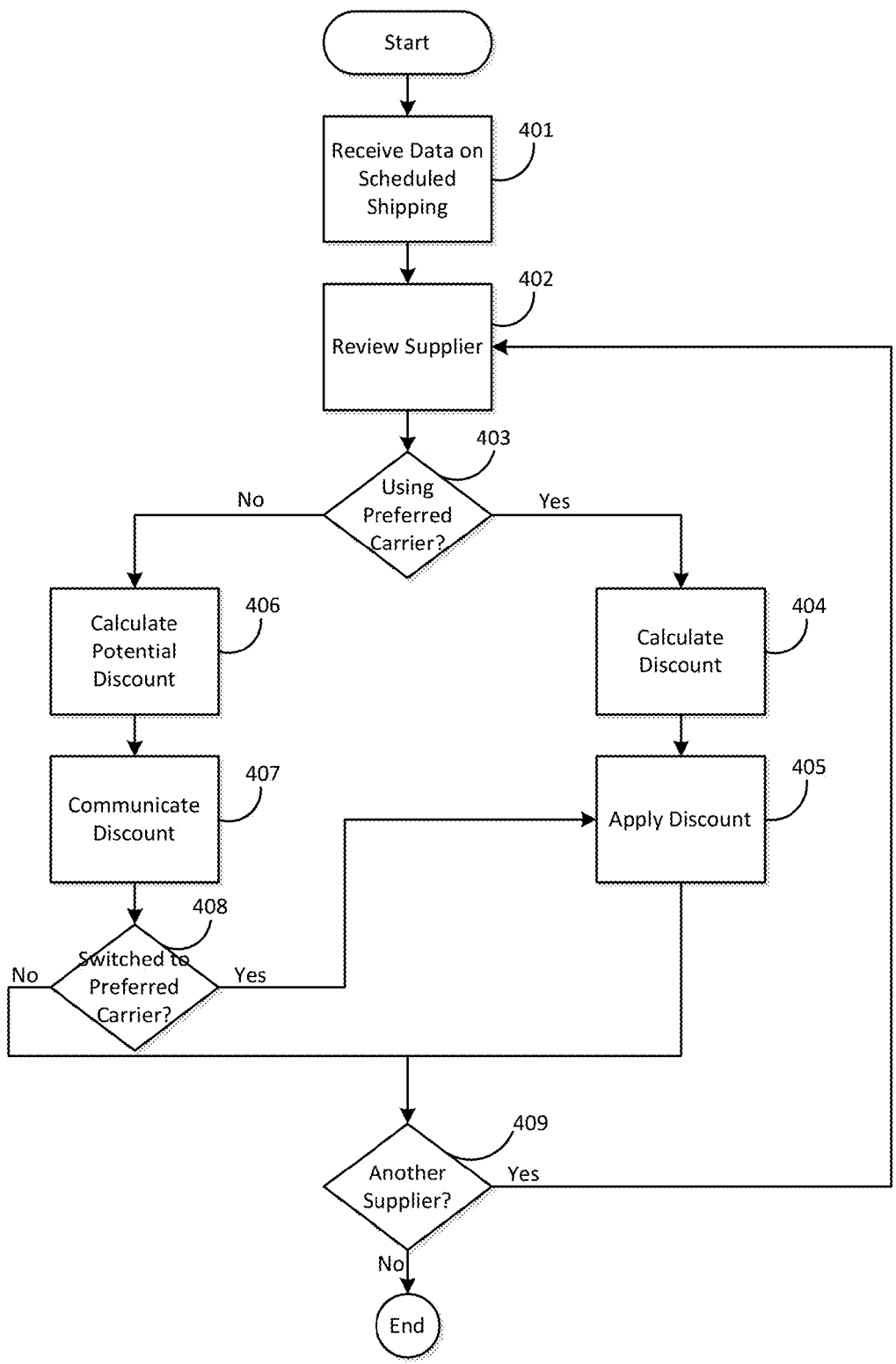
FIG. 4 shows a flow diagram of a preferred carrier discount module according to one embodiment of the invention.
Figure 5:
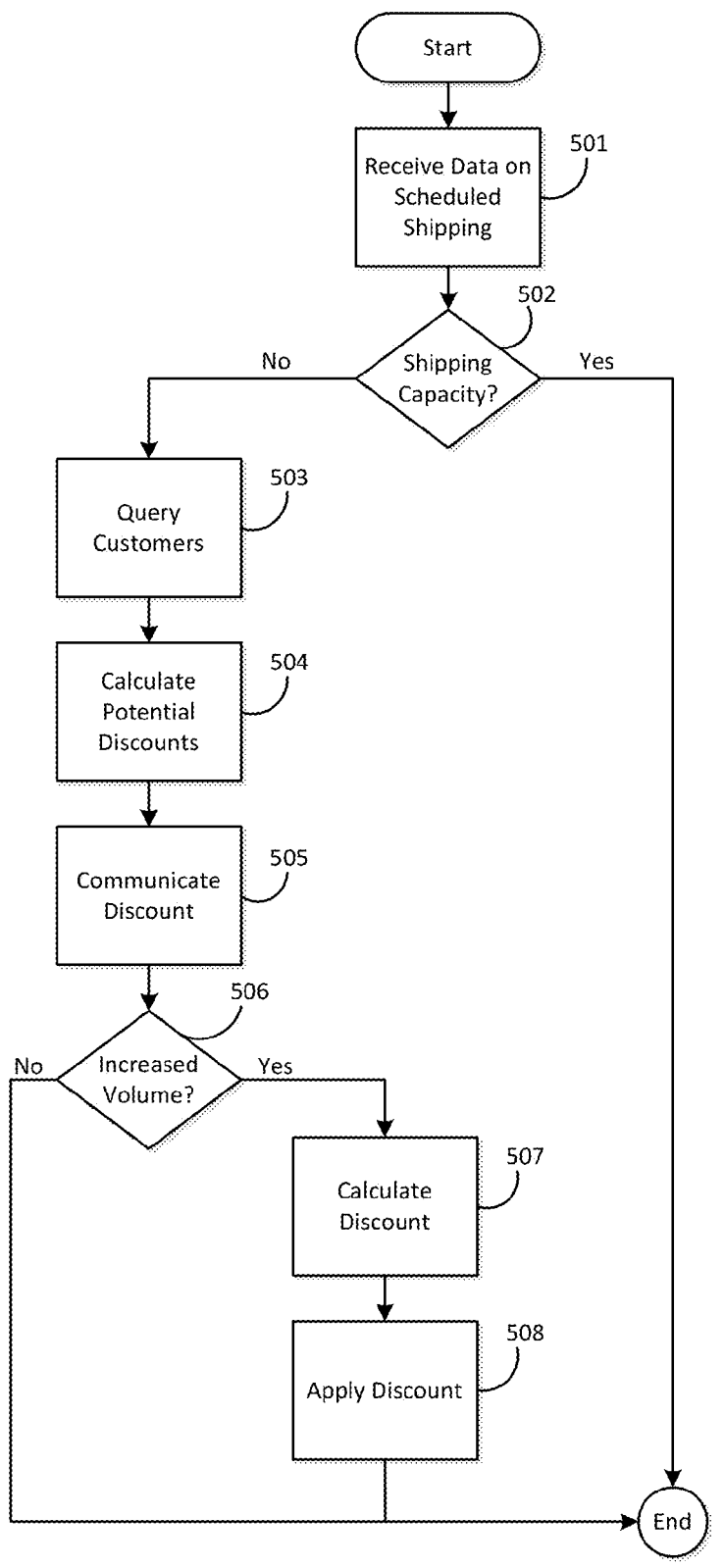
FIG. 5 shows a flow diagram of a volume discount module according to one embodiment of the invention.

As noted above, various embodiments of the present invention provide systems and methods for determining and providing shipping discounts. Reference will now be made to FIGS. 4-5 which illustrate operations and processes as produced by these various embodiments. As previously mentioned, the discount application 300 that resides within the carrier systems 210 (e.g., resides on a server 200 in the carrier systems 210) or within some other system such as a third-party shipping management system may be comprised on one or more modules. For instance, FIG. 4 provides a flow diagram of a preferred carrier discount module that calculates and applies a discount to one or more entities' shipping costs as a result of shipping through a preferred carrier according to various embodiments. FIG. 5 provides a flow diagram of a volume discount module that calculates and applies a discount to one or more entities' shipping costs as a result of shipping a particular volume to an identified location according to various embodiments. These modules are described in greater detail below.

a. Preferred Carrier Discount Module

As previously discussed, in various embodiments, the server 200 may include a discount application 300, and this application 300 may include a preferred carrier discount (PCD) module configured to calculate and apply a discount to one or more entities' shipping costs as a result of shipping through a preferred carrier. FIG. 4 illustrates a flow diagram of the PCD module according to a particular embodiment. The flow diagram displayed in FIG. 4 may correspond to the steps carried out by the processor 60 in the server 200 shown in FIG. 3 as it executes the module in the server's RAM 67 according to various embodiments.

Returning to the example provided above with respect to the bicycle manufacturer 110, in particular embodiments, the bicycle manufacturer 110 may use a particular common carrier to handle the manufacturer's outbound shipping. That is, for this particular example, the bicycle manufacturer 110 uses a particular common carrier to ship bicycles manufactured by the manufacturer 110 to various distributors 160, 170, 180 within the manufacturer's supply chain. In addition, as previously explained, the manufacturer 110 is receiving inbound shipments of components used for the manufacturing of the bicycles from one or more suppliers 120, 130, 140, 150. In this particular example, the suppliers may or may not be using the same common carrier as the manufacturer 110 uses for its outbound shipping. Thus, for the sake of this example, "outbound" shipping is shipping being conducted by the manufacturer 110 and "inbound" shipping is shipping being received by the manufacturer 110.

In particular embodiments, the carrier systems 210 may receive information from the manufacturer 110 on what shipping the manufacturer 110 may be involved in over a particular time period. For instance, in one particular embodiment, the carrier systems 210 may be in communication with the manufacturer's 110 inventory system and may receive information on what materials are to be received by the manufacturer 110 from suppliers 120, 130, 140, 150 over a particular period of time such as the next seven days (i.e., week) and/or on what products are to be shipped out by the manufacturer 110 over the same seven days. In addition, in particular embodiments, the carrier systems 210 may review information within the systems 210 (e.g., tracking systems 220) on what shipments for the manufacturer 110 (inbound and/or outbound) are already in the carrier's shipping network for the manufacturer 110.

Thus, turning to FIG. 4, the PCD module receives data on the scheduled shipping for the manufacturer 110 over the particular time period, shown as Step 401. As one of ordinary skill in the art will understand in light of this disclosure, the particular time period may represent any number of different periods of time. For instance, the particular time period may be a day, a week, a month, or a time period representing all of the manufacturer's 110 scheduled shipping. Thus, returning to the example above of the bicycle manufacturer 110, in one particular embodiment, the PCD module receives information from the bicycle manufacturer's 110 inventory system which includes what inbound shipments of components the manufacturer 110 is scheduled to receive over the next week from its suppliers 120, 130, 140, 150 and what outbound shipments of assembled bicycles the manufacturer 110 is scheduled to ship over the next week to its distributors 160, 170, 180.

With this information, the PCD module reviews the inbound shipments coming from a first supplier (e.g., Supplier A 120) in the next week, shown as Step 402. From reviewing the information on the inbound shipments from Supplier A 120, the PCD module determines whether Supplier A 120 is shipping the inbound shipments of components to the bicycle manufacturer 110 using the carrier (e.g., preferred carrier), shown as Step 403. For instance, in one particular embodiment, the PCD module queries the carrier's tracking systems 220 to determine whether any shipments have been accepted and/or scheduled to be accepted by the carrier that are being shipped from Supplier A 120 to the bicycle manufacturer 110 over the next week. While in another embodiment, the PCD module compares the actual volume of inbound shipments coming from Supplier A 120 against an average, such as a three-month average or seasonally adjusted average.

In Step 404, if the PCD module determines Supplier A is planning to or has shipped one or more of the inbound shipments to the bicycle manufacturer 110 using the carrier, the PCD module calculates a discount on shipping costs based on the inbound shipments being shipped to the bicycle manufacturer 110 using the carrier. Depending on the embodiment, the discount is applied to the shipping costs incurred by Supplier A 120 and/or by the bicycle manufacturer 110, shown as Step 405. For instance, in one embodiment, the discount is applied to the bicycle manufacturer's outbound shipping cost. While in another embodiment, the discount is applied to both the bicycle manufacturer's 110 outbound shipping costs and Supplier A's 120 inbound shipping costs to the bicycle manufacturer 110.

The discount may be calculated in various embodiments based on different criteria. For instance, in particular embodiments, the carrier may be able to provide the discount because the bicycle manufacturer 110 is receiving and sending out shipments using the carrier. This is because the carrier's overall handling cost may be lowered for the inbound and outbound shipments because the carrier's delivery vehicles bring inbound shipments to the bicycle manufacturer 110 can be used to take outbound shipments from the bicycle manufacturer 110 upon being unloaded at the bicycle manufacturer's 110 location. Thus, in this particular instance, the discount may be calculated based on the volume of outbound shipments ready for pickup upon the inbound shipments arrival and the amount of the delivery vehicle's capacity that is used by the outbound shipments. Other factors may be considered in further embodiments. For example, in particular embodiments, the discount may be calculated based on the overall volume of inbound and/or outbound shipments made over a particular period of time to/from the bicycle manufacturer. One of ordinary skill in the art can envision several factors that may be used to calculate the discount in light of this disclosure. Therefore, in various embodiments of the invention, the PCD module can calculate and apply a discount to the bicycle manufacturer's and/or Supplier A's 120 shipping costs based on real-time factors associated with inbound and outbound shipments being made to the bicycle manufacturer 110.

Return now to FIG. 4, if instead in Step 403 the PCD module determines Supplier A 120 is not using the carrier to ship one or more of the inbound shipments to the bicycle manufacturer 110, the PCD module calculates a potential discount that may be applied to the bicycle manufacturer's shipping costs and/or Supplier A's shipping costs if Supplier A 120 were to switch the carrier shipping the inbound shipments to the bicycle manufacturer 110 to the preferred carrier, shown as Step 406. In this particular instance, the PCD module communicates the potential discount to the carrier, bicycle manufacturer 110, and/or Supplier A 120, shown as Step 407. For example, in one embodiment, the PCD module facilitates having an email sent to one or more employees of the bicycle manufacturer 110 and/or Supplier A 120 informing the employees of the potential discount the bicycle manufacturer 110 and/or Supplier A 120 may receive if the Supplier A 120 were to switch one or more of the inbound shipments over to being handled by the preferred carrier. Thus, in various embodiments, an incentive via a discount to shipping costs is offered that helps to entice the bicycle manufacturer 110 and/or Supplier A 120 to ship the inbound shipments going to the manufacturer 110 with the preferred carrier.

It should be noted that particular embodiments may provide other incentives to the parties besides a discount to shipping costs. For instance, in particular embodiments, the incentives may include preferred pickup times and/or locations and/or preferred shipping services. For example, the bicycle manufacturer 110 may prefer to have its inbound shipments received and/or outbound shipments picked up at a particular time each morning. Therefore, in this instance, the incentive offered by the carrier may honor the bicycle manufacturer's 110 preferred delivery and/or pickup times for shipments. In another example, the incentive may be to upgrade the delivery service from two-day delivery to one-day or overnight delivery. One of ordinary skill in the art can envision numerous incentives that may be used in light of this disclosure.

In Step 408, the PCD module determines whether any of the inbound shipments have been switched to be delivered by the preferred carrier. For instance, in one particular embodiment, the PCD module may query the tracking systems 220 of the preferred carrier to determine whether any new shipments have been received from Supplier A 120 to the bicycle manufacturer 110 for the particular period of time or the PCD module may receive an indication that Supplier A 120 has agreed to switch one or more of the inbound shipments being shipped to the manufacturer 110 to the preferred carrier. If so, the PCD module applies the appropriate discount to the shipping costs, shown as Step 405.

Finally, in Step 409, the PCD module determines whether the bicycle manufacturer 110 is receiving one or more inbound shipments from another supplier 120, 130, 140, 150 during the particular time period. If so, the PCD module returns to Step 402 and follows the same process as described above for the particular supplier 120, 130, 140, 150.

It should be noted that in particular embodiments, the PCD module may also consider shipments involving other entities within the bicycle manufacturer's distribution chain. For instance, in one particular embodiment, the PCD module may be configured to apply incentives (e.g., discounts) based on the outbound shipments being made by the manufacturer 110 to a particular distributor 160, 170, 180 and the outbound shipments being made by the particular distributor 160, 170, 180. For example, looking back at FIG. 1, the PCD module may apply a discount to shipping costs for the manufacturer 110 and/or Distributor A 160 based on the manufacturer using the preferred carrier to make outbound shipments of bicycles to Distributor A 160 and Distributor A 160 using the preferred carrier to make outbound shipments to the store 190. Again, such an arrangement may help the preferred carrier to reduce handling costs in particular embodiments.

b. Volume Discount Module

As also discussed, in various embodiments, the discount application 300 may also include a volume discount (VD) module configured to calculate and apply a discount to one or more entities' shipping costs as a result of shipping a particular volume to an identified location. FIG. 5 illustrates a flow diagram of the VD module according to a particular embodiment. The flow diagram displayed in FIG. 5 may correspond to the steps carried out by the processor 60 in the server 200 shown in FIG. 3 as it executes the module in the server's RAM 67 according to various embodiments.

Starting with Step 501, the VD module receives information on the scheduled shipping to a particular location. For instance, in one embodiment, the VD module queries the carrier's tracking systems 220 to determine what shipments are scheduled to be shipped to a particular location for a specified time period. The particular location and specified time period can vary depending on the embodiment. For example, the particular location may be an address or a zip code, and the specified time period may be a delivery day. In addition, the particular shipments considered by the VD module may vary depending on the embodiments. For example, the particular shipments considered may be the shipments made by one or more particular customers or all the shipments made to the particular location for the specified time period. Thus, the VD module receives information on the shipments scheduled to be shipped by the carrier to the particular address or zip code on the specified delivery day.

In Step 502, the VD module determines whether the shipping capacity for this particular location has been reached for the specified time period. For instance, in one embodiment, the VD module looks at the delivery vehicles scheduled to make deliveries to the particular location for the specified time period and determines whether any of the delivery vehicles have remaining capacity for additional shipments and/or looks at whether one or more additional delivery vehicles may be scheduled to make deliveries to the particular location for the specified time period in order to increase the available capacity for additional shipments. If the VD module determines the shipping capacity for the particular location has been reached for the specified time period, the VD module stops the process for the particular location and specified time period and may evaluate another location and/or specified time period.

However, if the VD module determines shipping capacity is still available for the particular location for the specified time period, the VD module queries customers to identify those who may potentially have additional shipments to ship to the particular location for the specified time period, shown as Step 503. For instance, in particular embodiments, the VD module queries shipping records for the carrier to identify customers shipping and/or receiving shipments in the particular location for the specified time period. In addition, in particular embodiments, the VD module queries the shipping records of the carrier to identify customers who have shipped and/or received shipments in the particular location. As a result, such customers can be targeted to obtain additional volume of shipments to be shipped to the particular location for the specified time period.

For example, the VD module may determine shipping capacity remains available for a particular address or zip code based on the shipments scheduled to be delivered to the address or zip code for the up-coming Tuesday. In this instance, returning to the example of the bicycle manufacturer 110, the VD module may identify that one of the distributors 160, 170, 180 located near the address or in this zip code is scheduled to receive three inbound shipments from the manufacturer 110 on the particular Tuesday. Thus, the VD module has identified the particular distributor 160, 170, 180 and manufacturer 110 as targets for potentially increasing the shipping capacity into the particular location for the specified period of time.

In Step 504, the VD module calculates potential discounts that may be applicable as a result in increased shipping capacity to the particular location for the specified time period. Thus, in particular embodiments, the VD module may determine potential discounts for various increments of increased shipping capacity for the particular location based on the amount of capacity available for the specified time period. It should be noted that similar to the PCD module, in particular embodiments, other incentives may be offered to the parties besides a discount to shipping costs such as preferred pickup times, locations, and/or shipping services.

Once the VD module has calculated the potential discounts, the VD module communicates the potential discounts to the one or more identified targets, shown as Step 505. Thus, returning to the example, the VD module communicates the potential discounts to the particular distributor 160, 170, 180 and/or to the manufacturer 110. As a result, the distributor 160, 170, 180 and/or the manufacturer 110 may decide to make additional shipments to the particular location for the specified time in order to receive the discount on shipping costs. Therefore, in Step 506, the VD module determines whether the carrier has received any increased volume for delivery to the particular location for the specified period of time. For instance, the VD module determines whether the distributor 160, 170, 180 and/or the manufacturer 110 has made additional shipments to the particular location for the specified time period. This step may be accomplished by the VD module querying the carrier's tracking systems 220 to determine whether the distributor 160, 170, 180 and/or the manufacturer 110 has made additional shipments to the particular location for the specified period of time.

If the distributor 160, 170, 180 and/or the manufacturer 110 has made additional shipments, the VD module calculates the discount based on the additional shipments, shown as Step 507. For instance, if the available capacity was twenty percent of the total capacity and the distributor 160, 170, 180 and/or the manufacturer 110 have made additional shipments that equate to ten percent of the total capacity, the VD module calculates the discount based on the additional ten percent of the total capacity now being used for shipments to the particular location for the specified period of time. Finally, in Step 508, the VD module applies the discount to the distributor's 160, 170, 180 and/or the manufacturer's 110 shipping costs. Therefore, in various embodiments of the invention, like the PCD module, the VD module calculates and applies a discount to the shipping costs based on the real-time volume being shipped to the particular location for the specified period of time.

Finally, it should be noted that in particular embodiments, the VD module may also perform similar functions as those described above with respect to considering shipments being made from a particular location for a specified time period. Thus, for these particular embodiments, the VD module receives information on the scheduled shipping from a particular location as opposed to the particular location. In these instances, the VD module performs virtually the same functions as described above but instead considers whether any shipping capacity remains from the particular location for the specified time period and calculates and applies a discount to one or more entities' shipping costs as a result of shipping a particular volume from the particular location.

c. Additional Comments

It should be understood that the functionality of the modules of the discount application 300 described above may be combined or separated in particular embodiments. Therefore, the descriptions of the modules are provided above as they relate to the functionality performed by various embodiments of the invention and should not be construed to limit the scope of the claimed invention.

V. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for applying a shipping incentive for a customer receiving inbound shipments from a plurality of parties, the method comprising the steps of:
   receiving information on the inbound shipments to be received from the plurality of parties;
   identifying parties of the plurality of parties shipping respective inbound shipments not using a preferred common carrier;
   for at least one of the identified parties shipping the respective inbound shipment coming from the particular party by using a carrier other than the preferred common carrier, determining an incentive, by at least one computer processor, that can be applied for the customer if the at least one of the identified parties were to ship the respective inbound shipment using the preferred common carrier; and
   in response to at least one of the at least one of the identified parties switching from shipping the respective inbound shipment by using the carrier other than the preferred common carrier to shipping the respective inbound shipment using the preferred common carrier, applying the corresponding incentive for the customer.

2. The method of claim 1, wherein the incentive is a discount on a cost of shipping for the customer.

3. The method of claim 2, wherein the shipping for the customer comprises the inbound shipments being received from the plurality of parties and outbound shipments being made by the customer.

4. The method of claim 1, wherein the incentive is a preferred shipping service for the customer.

5. The method of claim 1 further comprising the steps of:
for each party of the plurality of parties already shipping the particular inbound shipment coming from the particular party by using the preferred common carrier, determining an incentive, by the at least one computer processor, that can be applied for the customer; and
applying the corresponding incentive for the customer.

6. The method of claim 1, wherein the customer is a manufacturer and the plurality of parties is a plurality of suppliers.

7. A system for applying a shipping incentive for a customer receiving inbound shipments from a plurality of parties, the system comprising:
at least one computer processor configured to:
receive information on the inbound shipments to be received from the plurality of parties;
identify parties of the plurality of parties shipping respective inbound shipments not using a preferred common carrier;
for at least one of the identified parties shipping the respective inbound shipment using a carrier other than the preferred common carrier, determine an incentive that can be applied to the cost of shipping if the at least one of the identified parties were to ship the respective inbound shipment using the preferred common carrier; and
in response to at least one of the at least one of the identified parties switching from shipping the respective inbound shipment using the carrier other than the preferred common carrier to shipping the respective inbound shipment using the preferred common carrier, apply the corresponding incentive for the customer.

8. The system of claim 7, wherein the incentive is a discount on a cost of shipping for the customer.

9. The system of claim 8, wherein the shipping for the customer comprises the inbound shipments being received from the plurality of parties and outbound shipments being made by the customer.

10. The system of claim 7, wherein the incentive is a preferred shipping service for the customer.

11. The system of claim 7, wherein the at least one computer processor is further configured to:
for each party of the plurality of parties already shipping the particular inbound shipment coming from the particular party by using the preferred common carrier, determine an incentive for the customer; and
apply the corresponding incentive for the customer.

12. The system of claim 7, wherein the customer is a manufacturer and the plurality of parties is a plurality of suppliers.

13. A non-transitory computer-program product for applying a shipping incentive for a customer receiving inbound shipments from a plurality of parties, the computer-program product comprising executable code that when executed by at least one computer processor causes the at least one computer processor to:
receive information on the inbound shipments to be received from the plurality of parties;
identify parties of the plurality of parties shipping respective inbound shipments not using a preferred common carrier;
for at least one of the identified parties shipping the respective inbound shipment by using a carrier other than the preferred common carrier, determine an incentive that can be applied to the cost of shipping for the customer if the at least one of the identified parties were to ship the respective inbound shipment using the preferred common carrier; and
in response to at least one of the at least one of the identified parties switching from shipping the respective inbound shipment by using the carrier other than the preferred common carrier to shipping the respective inbound shipment using the preferred common carrier, apply the corresponding incentive for the customer.

14. The computer-program product of claim 13, wherein the incentive is a discount on a cost of shipping for the customer.

15. The computer-program product of claim 13, wherein the incentive is a preferred shipping service for the customer.

16. The computer-program product of claim 13, wherein the executable code, when executed by the at least one computer processor, causes the at least one computer processor to:
for each party of the plurality of parties already shipping the particular inbound shipment coming from the particular party by using the preferred common carrier, determine an incentive for the customer; and
apply the corresponding incentive for the customer.

* * * * *